United States Patent [19]
Dettre et al.

[11] 3,923,715
[45] Dec. 2, 1975

[54] AQUEOUS DISPERSIONS OF PERFLUOROALKYL ESTERS AND VINYL POLYMERS FOR TREATING TEXTILES

[75] Inventors: Robert Harold Dettre, Wilmington; Edward James Greenwood, Newark, both of Del.

[73] Assignee: E. I. Du Pont de Nemours and Company, Wilmington, Del.

[22] Filed: July 26, 1973

[21] Appl. No.: 382,843

[52] U.S. Cl...... 260/29.6 R; 106/15 FP; 117/138.8; 260/29.6 MN
[51] Int. Cl.² .................... C08L 25/06; C08L 31/02
[58] Field of Search .. 260/29.6 R, 29.6 F, 29.6 MN, 260/485 F; 106/15 FP

[56] References Cited
UNITED STATES PATENTS

| | | | |
|---|---|---|---|
| 2,803,615 | 8/1957 | Ahlbrecht et al. | 260/29.6 F |
| 2,937,098 | 5/1960 | Geen | 260/29.6 R |
| 3,668,233 | 6/1972 | Pavlik | 260/485 F |

*Primary Examiner*—Harold D. Anderson
*Attorney, Agent, or Firm*—James A. Costello

[57] ABSTRACT

Dry soil resistance and nonflame propagating characteristics are insured in textile fibers by applying thereto an aqueous dispersion containing at least 5 weight percent of a perfluoroalkyl ester of a carboxylic acid of from 3 to 30 carbon atoms. After the dispersion is applied, the fibers are dried at between 120° to 170°C.

7 Claims, No Drawings

AQUEOUS DISPERSIONS OF PERFLUOROALKYL ESTERS AND VINYL POLYMERS FOR TREATING TEXTILES

BACKGROUND OF THE INVENTION

This invention concerns the application of aqueous dispersions of certain perfluoroalkyl esters to textile fibers followed by drying. The fibers are thus invested with a coating that is resistant to dry soiling and that does not propagate a flame.

Polymers and other compounds containing highly fluorinated segments are widely used for providing oil and water repellency to textile substrates. When applied to carpets of synthetic, thermoplastic fibers such as polyesters, polyamides, and polyacrylics fluoropolymeric coatings such as the polymers of perfluoroalkylacrylates and methacrylates provide a degree of resistance to dry, traffic-caused soiling. While carpets of the aforementioned thermoplastic polymers do not burn readily in uncoated form, the coated fibers may support the advance of a flame as from a dropped match, and, if they do, cannot be tolerated for commercial or home carpeting use. The susceptibility of treated fiber carpets to burning is particularly noticeable when the carpet construction is of the loose or shag type.

It has now been found that a class of highly fluorinated compounds can provide superior dry soil resistance and still preserve the same resistance to burning possessed by the uncoated fibers. The useful fluorinated compounds are mono- and polycarboxylic acid esters which volatilize at or near the melting point of the thermoplastic substrate.

SUMMARY OF THE INVENTION

This invention concerns an aqueous dispersion of a composition consisting essentially of more than 0 and up to 95 percent of a nonfluorinated vinyl polymer having an adjusted Vickers Hardness of about 10 to 20, and 5 to less than 100% of a perfluoroalkyl ester of a carboxylic acid of from 3 to 30 carbon atoms, the ester being volatile at about 200° to 300°C., the composition forming up to about 60% of the total weight of the dispersion the nonfluorinated vinyl polymer and the perfluoroalkyl ester amounting to 100% of the composition.

This invention is also concerned with thermoplastic fibers coated with the aqueous dispersion as well as with the process for applying the aqueous dispersion uniformly to the surface of the fibers, followed by drying the fibers at about 120°C. to 170°C.

By vinyl polymer is meant a polymer derived by polymerization or copolymerization of vinyl monomers (vinyl compounds) including vinyl chloride and acetate, vinylidene chloride, methyl acrylate and methacrylate, acrylonitrile, styrene and vinyl esters and numerous others characterized by the presence of a carbon double bond in the monomer molecule which opens during polymerization to make possible the carbon chain of the polymer. The preferred vinyl polymers for use as a constituent of the compositions of the invention are polymethyl methacrylate and polystyrene, each having an adjusted Vickers Hardness of 16.1.

THE PILL TEST

The Department of Commerce of the United States Federal Government has published an official test (the pill test) for testing surface flammability of carpets and rugs. This test method is found in the Federal Register, Vol. 35, No. 74 - Thursday, April 16, 1970, and it has been used during the development of the instant invention for evaluating the effect on the flammability of carpet fibers when they are coated with the compositions of interest. In this test a standard size piece of carpet is exposed in a controlled environment to an ignited methenamine tablet. The test is continued until the last vestige of flame or glow disappears, or until the flaming or smoldering has progressed to within one inch of an arbitrary circle 8 inches in diameter centered at the point of ignition. Eight specimens of each material are tested, and for seven of the eight the charred area must not extend to within the prescribed distance of the circle if the carpet flammability is to be graded acceptable.

While the grading of the test is specified as depending on the distance traveled by the burning, further knowledge can be gained about the burning characteristics of carpets through observation of the relative area burned and by the rate of burning.

DETAILS OF THE INVENTION

Many of the known esters of fluorinated alcohols and organic acids are useful in the compositions of the invention. Representative of the fluorinated alcohols that can be used are $(CF_3)_2CFO(CF_2CF_2)_pCH_2CH_2OH$ where $p$ is 1 to 5; $(CF_3)_2CF(CF_2CF_2)_qCH_2CH_2OH$ where $q$ is 1 to 5; $R_fSO_2N(R')CH_2OH$ where $R_f$ is perfluoroalkyl of 4 to 12 carbons and $R'$ is H or lower alkyl; $C_nF_{2n+1}(CH_2)_mOH$ or —SH where $n$ is 3 to 14 and $m$ is 1 to 12; $R_fCH_2C(X)H(CH_2)_rOH$ where $r$ is >1 X is —O$_2$C-alkyl, —(CH$_2$)$_s$OH, —(CH$_2$)$_s$O$_2$C alkyl or —OH wherein $s$ is an integer of 0 to 10 and $R_f$ is perfluoroalkyl of 3 to 21 carbons; $R_fCON(R)$—(CH$_2$)$_t$OH where $R_f$ is perfluoroalkyl of 4 to 18 carbons, $t$ is 2 to 6 and R is an alkyl group of 4 to 10 carbons.

The preferred fluorinated esters utilize perfluoroalkyl aliphatic alcohols of the formula $C_nF_{2n+1}(CH_2)_m$—OH where $n$ is from about 3 to 14 and $m$ is 1 to 3. Most preferred are esters formed from a mixture of the alcohols where $n$ is predominantly 10, 8 and 6 and $m$ is 2. These esters can be formed by reacting the alcohol or mixture of alcohols with mono- or polycarboxylic acids which can contain other substituents and which contain from 3 to 30 carbons. In one method of preparing the esters, the alcohol is heated with the acid in the presence of catalytic amounts of p-toluenesulfonic acid and sulfuric acid, and with benzene, the water of reaction being removed as a codistillate with the benzene. The residual benzene is removed by distillation to isolate the ester. Table I below lists a representative group of esters so prepared, with pertinent physical properties. The perfluoroalkyl group in these esters is $C_nF_{2n+1}(CH_2)_m$- as indicated above, where $n$ is 6 to 14 and $m$ is 2.

TABLE I

| Perfluoroalkylethyl Ester of | Ester Number (Theory) | Acid No. | Melting Range (°C.) |
|---|---|---|---|
| a. Acetic acid | 102 (106) | 0.5 | 23–24 |
| b. Octanoic acid | 95.9 (91.5) | 1.3 | 33–35 |
| c. Decanoic acid | 91.8 (87.6) | 0.5 | 30–32 |
| d. Lauric acid | — | — | 35–38 |
| e. Palmitic acid | — | — | 49–50 |
| f. Delta-chlorovaleric acid | — | 1.2 | 40–42 |
| g. Oleic acid | 78 (75) | 3.0 | 28–30 |
| h. Linoleic acid | 79.4 (74.9) | 4.3 | 22–27 |
| i. Malonic acid | 114 (108) | 0.1 | 31–33 |
| j. Succinic acid | 112 (106) | 0.9 | 35–38 |

TABLE I-continued

| Perfluoroalkylethyl Ester of | Ester Number (Theory) | Acid No. | Melting Range (°C.) |
|---|---|---|---|
| k. Adipic acid | 109 (103) | 0.7 | 35–38 |
| l. Suberic acid | 107 (101) | 1.3 | 43–48 |
| m. Sebacic acid | 104 (98) | 3.1 | 45–52 |
| n. Dodecanedioic acid | 103 (96) | 1.5 | 52–58 |
| o. Tridecanedioic acid | 119 (95) | 1.7 | 51–54 |
| p. Maleic acid | 119 (106) | 0.9 | 28–32 |
| q. Azelaic acid | 107 (100) | 0.5 | 35–39 |
| r. Itaconic acid | 101 (105) | 1.9 | 45–48 |
| s. Benzyl malonic | 91 (99) | 0.2 | 40–42 |
| t. o-Phthalic acid | 101 (101) | 0.3 | 25–27 |
| u. d,l-Camphoric acid | — | 1.7 | 34–36 |
| v. Citric acid | 93 (100) | 4.8 | 42–48 |

The 2-perfluoroalkyl ethanols of the formula $C_nF_{2n+1}CH_2CH_2OH$ wherein $n$ is from 6 to 14, and preferably a mixture of 2-perfluoroalkylethanols whose values of n are as described above can be prepared by the known hydrolysis with oleum of 2-perfluoroalkylethyl iodides, $C_nF_{2n+1}CH_2CH_2I$. The 2-perfluoroalkylethyl iodides can be prepared by the known reaction of perfluoroalkyl iodide with ethylene. The perfluoroalkyl iodides can be prepared by the known telomerization reaction using tetrafluoroethylene and thus each perfluoroalkyl iodide differs by $—(CF_2—CF_2)—$ unit.

To produce the compounds used in the process of the present invention wherein the number of carbon atoms in the perfluoroalkyl portion of the molecule is in the range of 6 to 14, removal of perfluoroalkyl iodides boiling below about 116°–119°C. (atmospheric boiling point of $C_6F_{13}I$) and above about 93°C.–97°C. at 5 mm. pressure (5 mm. pressure boiling range of $C_{14}F_{29}I$) is carried out. This yields a mixture of perfluoroalkyl iodides wherein the number of carbon atoms in the perfluoroalkyl portion of the molecule is in the range of 6 to 14 carbon atoms. Another method for preparing esters employed in the instant invention is to react perfluoroalkylethyl bromides or iodides with an alkali metal carboxylate in an anhydrous alcohol.

A preferred fluoroester for use in the compositions of the invention is the citric acid ester listed at v in Table I. Also preferred is the citric acid urethane. Therein, the citric acid ester is modified by reacting the ester with an isocyanate compound, for example, 1-methyl-2,4-diisocyanatobenzene, which reacts with the —OH group of the citric acid ester to form urethane linkages. This product, whose preparation is shown in Example 2 herein has sufficient volatility to be removed at a temperature of about 300°C., and provides good soil repellency on polyester and polyamide carpets. It is especially valuable because it seems to resist removal by abrasion better than many other fluororepellents.

While the invention is not limited to the operation of a particular theory, it is hypothesized that the enhanced burning of synthetic polymeric floor coverings when treated with fluorinated polymers is due to a lowering of the surface tension of the melted polymer, which thus reduces the rate of drawback from the flame front during burning. Where the fluoro repellent compound is sufficiently volatile during burning, it is thereby removed, and does not lower the surface tension of the melted material, thus preserving its flame resistant character.

As indicated, the fluorinated esters useful in the invention are those which volatilize at about the melting point of the substrate. Practically speaking this means volatile at about 200°C. to 300°C. and a simple test has been defined for this determination. The test depends also on the fact that fluorinated esters having $(CF_3)(CF_3)CF—$, or, $CF_3—CF_2—CF_2—$, segments exhibit surfactant qualities, particularly in oily media.

In this test a tuft of treated carpet weighing about 0.05 g. is placed on a glass slide and inserted into a tube furnace at 450°–550°C. for 10 to 20 seconds. During the few seconds in the furnace the fibers in the tuft melt and coalesce into droplets on the slide. After cooling to 25°C. the hexadecane contact angle is measured on the solidified droplet. If the fluorinated ester treatment is surface active in the polymer, thereby lowering its surface tension and is also stable to the test conditions of temperature and time, then the hexadecane contact angle on the solidified droplet will be somewhat higher than the angle observed on a solidified droplet obtained by applying the test to a tuft from an untreated carpet. Esters which are not volatile in this test are not useful in this invention.

Of course, esters that volatilize at a low temperature, room temperature for instance, would not be useful either, since they would not provide the desired soil repellency for any reasonable period of time. When fluorinated esters useful in the invention are heated at temperatures of 250° to 300°C. they volatilize slowly, and at about 300°C. are completely removed. Fluorinated acrylate and methacrylate polymers, such as polymerized $CF_3(CF_2)_8CH_2CH_2OOC—CH=CH_2$ do not generally volatilize completely until temperatures of about 400°C. are attained. When tested in an oven at about 500°C. as described in the test conditions, polymers of this kind do not volatilize significantly even after 35 seconds in the oven. The test thus serves very satisfactorily to distinguish those compounds which will volatilize at the usual synthetic carpet fiber melting temperatures of 200° to 300°C.

The fluorinated esters can be applied to synthetic thermoplastic fibers such as polyester and polyamide fibers in any known manner so as to leave from about 0.01 to 1.0% of the ester on the fibers, based on dry fiber weight. In one method of application an aqueous treating dispersion can be prepared as follows: The ester is liquefied by mixing with a small amount of volatile solvent such as methyl isobutyl ketone or the like, and the product dispersed in water containing a little cationic surfactant such as a tetraalkylammonium halide to make a composition containing about 10% ester. This aqueous dispersion can be extended in water for application to a textile substrate such as a synthetic fiber carpet. Spray application, dipping and wringing, curtain coating or the like can be employed to coat the fibers uniformly with the dispersion, followed by drying at about 120°–170°C.

Treated carpets exhibit outstanding dry soil resistance in wear tests. Such tests involve exposure of a group of carpet pieces, both treated and untreated, to normal foot traffic in a known environment. The relative position of the test pieces is changed at regular intervals, usually every day, in order to ensure equal exposure of all pieces. The pieces are vacuum cleaned once a day, all in exactly the same manner. After 10,000 people have walked over the carpet pieces (by automatic count), the pieces are examined and graded visually on a scale of 0 to 100 compared to the appearance of a similar carpet which has been processed in the same manner as the treated carpet pieces, but without any repellent present during the treatment (water-treated control).

The water present during this control treatment removes any soluble material from the fibers in the same way that the aqueous repellent application does for the repellent treated samples. The numbered ratings have the following meaning:

0 - worse than water treated control
50 - equal to control
70 - slightly better than control
80 - noticeably better than control
90 - considerably better than control
100 - extremely slight soiling The differences are quite easily discernible with the indicated amount of traffic which, for the tests reported herein, took about two weeks to complete.

ADJUSTED VICKERS HARDNESS

A Vickers diamond indenter is used in an Eberbach Micro Hardness Tester (Eberbach Corp., Ann Arbor, Mich.). The procedure follows that described in American Society of Testing Materials Standard D 1474–68 for Knoop Hardness, with the following adjustments.

1. A Vickers indenter is used instead of a Knoop indenter.
2. A 50 gram load is used instead of a 25 gram load.
3. The load is applied for 30 seconds instead of for 18 seconds.
4. The measurement is made at 25 ± 10 percent relative humidity instead of 50 ± 5 percent relative humidity.
5. The hardness value is calculated using the Vickers formula instead of the Knoop formula.

The Vickers Hardness method is described in the American Society of Testing Materials Standard E 92–67. Description of the Vickers indenter and the calculation of Vickers Hardness is found therein.

The term "adjusted Vickers Hardness" refers to the hardness value obtained by using the Vickers formula but not the Vickers method. The vinyl polymers which function satisfactorily in the compositions of the invention must possess an adjusted Vickers Hardness of about 10 to 20. Adjusted hardness can be determined on a polymer sample deposited on a glass plate in solvent solution, the solvent being evaporated and a smooth coating obtained by heating at about 150° to 175°C. for 3 to 5 minutes. Alternatively, a smooth coating can be obtained by pressing between glass plates at 100° to 150°C. after the solvent has evaporated. Any suitable solvent can be employed to dissolve the polymers, ethers, ketones and other good solvent types being particularly useful. The coating should be sufficiently thick (75 to 250 microns) so that the indenter used in the test does not penetrate more than 15% of the coating thickness.

Polymethyl methacrylate latices can be prepared by known aqueous emulsion polymerization to provide dispersions containing very fine particles of high molecular weight and narrow molecular weight distribution using an oxygen-free system and an initiator such as potassium persulfate/sodium bisulfite in combination.

The aqueous dispersion of fluorinated ester can be blended with an aqueous latex of polymethyl methacrylate to make a composition which is extendible in water, and can be diluted therewith for application to textile substrates. The dispersion before dilution will normally contain from about 5% to 15% of the fluorinated ester and 3 to 30% of the methyl methacrylate polymer.

For application to textile substrates such as carpets the above described dispersion is diluted still further with water. The application can be made in any known manner is already described for application of the fluorinated esters themselves. Significant soil repellency is achieved with at least about 0.1% of the fluoroester on the fibers, based on fiber weight. Amounts greater than 1% do not seem to improve repellency significantly. The presence of the methacrylate polymer improves soil repellency and particularly enhances the durability of the treatment on the fibers. The methacrylate polymer should be present in not more than about 3% based on fiber weight. Higher loadings tend to increase flammability as indicated by char length in the Pill Test.

After the composition has been applied to the carpet it is dried and cured on the fibers by passing the carpet through an oven, exposing it to temperatures of about 120°C. to 170°C. for about 5 to 10 minutes.

The repellency tests applied to treated and untreated carpet pieces in the following examples were: Water Repellency Spray Test No. AATCC 22-1964; Oil Repellency Test No. AATCC 118-1966T.

The following Examples are intended to illustrate the invention. They are not meant to limit the invention. Unless otherwise indicated, all quantities are by weight.

PREPARATION OF POLY(METHYL METHACRYLATE)

Into a stirred flask were poured 178.5 parts of water, 19.5 parts of acetone and 11.6 parts of a 25% aqueous solution of dimethyloctadecylamine acetate. The solution was purged of oxygen by bubbling nitrogen through it for an hour. A dropping funnel was attached to the flask, and in the funnel was prepared a solution of 90 parts methyl methacrylate, 0.23 part 2-hydroxyethyl methacrylate and 0.49 part of dodecyl mercaptan. The contents of the funnel were also purged with nitrogen for an hour. The solution in the flask was adjusted to 70°C. and a 1.1 part of a 10% aqueous solution of $\alpha, \alpha'$-azobisisobutyramidine hydrochloride was added. The methyl methacrylate solution in the dropping funnel was added to the aqueous solution in the flask over about an hour while keeping the temperature at about 70°C. by external cooling. After all had been added the mixture was kept at 70°C. for another 4 hours. Finally, 30 parts of water were added. There were obtained 325.5 parts of polymer latex containing 28.1% solids. The latex had an inherent viscosity in acetone at 30°C. of 0.27.

EXAMPLE 1

Perfluoroalkylethanol (4765 g.) which was a mixture of 2-perfluoroalkylethanols containing 8 to 16 carbon atoms (6 to 14 carbon atoms in the perfluoroalkyl portion of the molecule) and whose average molecular weight was 487, stearic acid (2845 g.) and benzene (1250 g.) were placed in a reaction flask. The charge was slowly heated and when the temperature was about 55°C., p-toluenesulfonic acid (0.8 g.) and sulfuric acid (96%, 6.5 g.) were added to the flask. Heating was continued and at about 87°C., benzene began to reflux and water was separated from benzene in a modified Dean Stark trap wherein the benzene was returned to the flask. The pot temperature gradually rose to 109°C. over an 11 hour reaction period, during which time water was continuously removed. The reaction mass was then cooled to about 95°C. and 440 g. of 10% sodium carbonate solution was slowly added over a period of about two hours. The reaction mass was again heated to remove water and the residual benzene was removed at around 88°C. at 20 mm. Hg. pressure. The reaction mass was filtered at around 90°C. to yield 6944 g. (93% yield) of 2-perfluoroalkylethyl stearate. The product was light tan solid and melted in the temperature range of 42° to 48°C. Ester Number found 76.0, 75.6; Calculated 72.0; Acid Number found 0.03, 0.03; Calculated 0.

EXAMPLE 2

A. Into a reaction flask were charged 50 parts of the perfluoroalkyl ester of citric acid listed at v in Table I and 2.8 parts of 1-methyl-2,4-diisocyanatobenzene. The mixture was heated gently until molten, then 0.05 part of butyl tin trichloride was added and the charge heated to 100°C. and held for 1 hour. The temperature was then adjusted to 80°C. and held there during the remainder of the reaction. After 4 hours at 80°C. another 0.05 part of butyl tin trichloride was added. After a total heating time of 28 hours tests indicated that the —NCO groups of the isocyanate were almost completely reacted, and the reaction was judged finished. There were recovered 53 parts of citric acid urethane melting at 53° to 57°C.

B. In a high shear blender there was prepared a mixture containing 1 part deionized water and 1 part of a 25% aqueous solution of dimethyl octadecylamine acetate. To the mixture was added 1.82 parts of the ester of A) and 0.91 parts of methyl isobutyl ketone. After blending for 10 minutes there were added 20 parts of the 28.1% solids methyl methacrylate latex prepared as described above. Solids content of the product dispersion was 29.0%, the solids containing 14.2% fluorine. The prepared dispersion thus contained as solids about 25% of the solid fluorine containing product of A) and 75% of the polymethyl methacrylate.

EXAMPLE 3

The dispersion of Example 2B was applied to 100% polyester shag carpet by diluting with water and padding to leave 10% of the dispersion based on fiber weight. After drying and curing for 10 minutes at 130°C. several tufts of the treated carpet were tested as hereinbefore described by heating in a furnace, then determining hexadecane contact angles on the cooled droplets. Results are shown in Table II below of both contact angle tests and water and oil repellency of the treated carpet.

A piece of the same carpet material was treated with a commercial fluorinated polymer for comparison. In Table II the ± values under the heading "Contact Angles" represent standard deviations as determined after numerous repetitive tests.

treated carpet pieces showed much higher contact angles. This indicates that the polymer treated pieces retained the fluoropolymer and its surfactant property through the high temperature test conditions, while the carpet pieces treated with the composition of the invention retained only a vestige of the fluoro compound.

A series of 8 inch squares of the same yellow polyester shag carpet employed above were treated by padding in the dispersion product of Example 2B and wringing to leave 10% of the dry fiber weight of the 29% solids dispersion on the fibers. They were then dried and cured by drying in an oven at 130°C. for 10 minutes. When the surface flammability (pill test) test was applied to the test carpet pieces, the average char length, pill to edge of burned area, was 0.94 inch. The average total burning time was 1.73 minutes. The methenamine pills used are designed to burn for 2 minutes. The treated carpet thus passed the test since the burned area extended to within only 3 inches from the prescribed 4 inch diameter circle. The test would have been failed if the burned area extended at any point to within 1 inch or less of the circle.

A large piece of level loop nylon carpet was then treated by spraying with the diluted Example 2B dispersion to leave on the carpet fibers 4% of their weight of the dispersion (1.16% solids based on carpet weight). Drying and curing was carried out by exposing the treated carpet to a 150°C. oven temperature for 5 minutes. Both repellency and dry soil resistance traffic tests were carried out on portions of the treated carpet. The results obtained are shown in Table III below.

TABLE III

| | Water Repellency | Oil Repellency | Dry Soil Resistance |
|---|---|---|---|
| Initial | 80 | 7 | — |
| After 10,000 Traffics | 70 | 5 | 90+ |

EXAMPLES 4 and 5

Two more compositions were prepared for treating nylon carpet to provide dry soil repellency. One composition was an aqueous dispersion containing 7.2% of the fluorinated urethane product of Example 2A. The second composition was an aqueous dispersion containing 1.6% of the Example 2A product and 31.3% of polymethyl methacrylate solids. These two dispersions were applied to yellow polyester shag carpet for pill test and again to nylon carpet for dry soil repellence after traffic test as described in Example 3. The results are shown in Table IV below. The Example 4 application provided 0.29% solids on the nylon carpet, and 0.72% solids on the polyester carpet. The Example 5 application provided 1.32% solids on the nylon carpet and 3.29% solids on the polyester carpet.

TABLE II

Hexadecane Contact Angles on Solidified Droplets of Molten Carpet Tufts

| Sample | Thermal Treatment | Water/oil Repellency | Contact Angles (25°C.) | |
|---|---|---|---|---|
| | | | Advancing | Receding |
| Untreated | 460°–510°C. for 15–20 seconds | 0/0 | 42 ± 8° | 25 ± 7° |
| Test Carpet (Example 3) | ″ | 80/6 | 50 ± 9 | 30 ± 8 |
| Polymer treated | ″ | 90/5 | 78 ± 1 | 73 ± 4 |

As indicated, the contact angles deriving from untreated and test carpet pieces were about the same (within experimental error) while fluoropolymer

TABLE IV

| Ex. | Char Length (inches) | Burn Time (minutes) | Carpet Tests Repellency Water/Oil | | Dry Soil Resistance After 10,000 Traffics |
|---|---|---|---|---|---|
| | | | Initial | After 10,000 Traffics | |
| 4 | 1.44 | 1.55 | 70/6 | 70/4 | 70 |
| 5 | 2.23 | 2.56 | 70/5 | 70/0 | 80 |

While both treatments provided carpets passing the burn test, it is noted that the carpet treated with the Example 5 dispersion, which contained only 5% solids from the fluorine-containing compound, burned more and provided less durable oil repellency than that treated with the Example 4 dispersion which contained the fluorine compound exclusively. The carpet treated with the Example 5 dispersion contained 3.1% methacrylate polymer, based on fiber weight, which is slightly more than the recommended 3% limit.

EXAMPLES 6 to 13

A series of aqueous dispersions were prepared and tested as described in the previous Examples. Pill tests were performed on polyester shag carpet treated with 10% of each dispersion based on carpet weight. Traffic and repellency tests were performed on nylon carpet treated with 4% of each dispersion based on carpet weight. The 4% applications were made by spraying, so that essentially all of the treatment dispersion was on the fiber surfaces. Comparisons 14, 15 and 16 are not dispersions of the invention. Results of these tests are shown in Table V below.

We claim:

1. An aqueous dispersion of a composition consisting essentially of more than 0 and up to 95 percent of a nonfluorinated vinyl polymer having an adjusted Vickers Hardness of about 10 to 20, and 5% to less than 100% of a perfluoroalkyl ester of a carboxylic acid of from 3 to 30 carbon atoms, the ester being volatile at about 200°C. to 300°C., the composition forming up to about 60% of the total weight of the dispersion, the nonfluorinated vinyl polymer and the perfluoroalkyl ester amounting to 100% of the composition.

2. a dispersion according to claim 1 wherein the vinyl polymer is polymethyl methacrylate.

3. A dispersion according to claim 1 wherein the vinyl polymer is polystyrene.

4. A dispersion according to claim 1 wherein the perfluoroalkyl ester is the ester of citric acid.

5. A dispersion according to claim 1 wherein the perfluoroalkyl ester is the citric acid urethane.

6. A dispersion according to claim 1 wherein the vinyl polymer of the composition is polymethyl methacrylate and the ester is the ester of citric acid.

7. A dispersion according to claim 6 wherein the vinyl polymer is about 64% and the ester is about 36% of the composition.

TABLE V

| Example or Comparison | Composition | Proportion Fluoro/ Non-Fluoro | Total Solids % | Pill Test | | Repellancy Water/Oil | | Dry Soil Resistance 10,000 Traffics |
|---|---|---|---|---|---|---|---|---|
| | | | | Char Length inches | Burn Time minutes | Initial | After Traffic | |
| 6 | Fluorostearate/ Polymethylmethacrylate | 22/78 | 31.7 | 1.09 | 1.67 | 70/0 | 0/0 | 70 |
| 7 | Fluorocitrate/ Polymethylmethacrylate | 5/95 | 32.9 | 1.75 | 1.80 | 70/2 | 50/0 | 80 |
| 8 | Fluorocitrate/ Polymethylmethacrylate | 22/78 | 32.7 | 1.09 | 1.79 | 70/6 | 50/2 | 80 |
| 9 | Fluorocitrate/ Polymethylmethacrylate | 36/64 | 19.6 | 1.11 | 1.62 | 70+/6 | 50/3 | 80 |
| 10 | Fluorocitrate/ Polymethylmethacrylate | 54/46 | 11.7 | 1.08 | 1.65 | | | |
| 11 | Fluorocitrate/ Polymethylmethacrylate | 70/30 | 9.8 | 1.25 | 1.60 | | | |
| 12 | Fluorocitrate/ Polystyrene | 37/63 | 19.6 | 0.80 | 1.67 | 70/6 | 70/2 | 80 |
| 13 | Fluorocitrate | 100/0 | 7.2 | 0.73 | 1.53 | 70/6 | 70/4 | 70 |
| Comparison 14 | Polymethyl methacrylate | 0/100 | 10.0 | 0.88 | 1.65 | 70/0 | | 70 |
| Comparison 15 | Fluoropolymer (commercial) | 100/0 | 23.8 | 1.94 | 2.08 | 90/6 | 50/3 | 50 |
| Comparison 16 | Water Treated Control | — | — | 0.76 | 1.63 | 0/0 | 0/0 | 50 | of the composition.

* * * * *